United States Patent
Sågfors et al.

(10) Patent No.: US 8,010,115 B2
(45) Date of Patent: Aug. 30, 2011

(54) METHOD FOR REDUCING UPLINK TRAFFIC LOAD ON TRANSPORT NETWORK AT BASESTATION DURING SOFT HANDOVER

(75) Inventors: Mats Sågfors, Kyrkslätt (FI); Per Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 531 days.

(21) Appl. No.: 12/097,663

(22) PCT Filed: Dec. 14, 2005

(86) PCT No.: PCT/SE2005/001923
§ 371 (c)(1),
(2), (4) Date: Jun. 16, 2008

(87) PCT Pub. No.: WO2007/069948
PCT Pub. Date: Jun. 21, 2007

(65) Prior Publication Data
US 2009/0258651 A1 Oct. 15, 2009

(51) Int. Cl.
*H04W 36/00* (2009.01)
(52) U.S. Cl. .......... 455/442; 455/522; 370/331
(58) Field of Classification Search .......... 455/442, 455/522; 370/331
See application file for complete search history.

(56) References Cited

U.S. PATENT DOCUMENTS

| 7,079,512 | B1 * | 7/2006 | Alam et al. ........... 370/331 |
| 2002/0119780 | A1 | 8/2002 | Roux et al. |
| 2004/0116143 | A1 | 6/2004 | Love |
| 2006/0059399 | A1 * | 3/2006 | Hu et al. ........... 714/748 |

FOREIGN PATENT DOCUMENTS
GB 2 415 326 A 12/2005

OTHER PUBLICATIONS

3GPP Document, TSG RAN meeting 22, Maui, USA Dec. 9-12, 2003.*
Fuyun Ling et al "Behavior and performance of power controlled IS-95 reverse-link under soft handoff" Vehicular Technology, IEEE Transactions on, vol. 49, No. 5, pp. 1697-1704, Sep. 2000. See section III-A and abstract.

* cited by examiner

*Primary Examiner* — Charles Shedrick

(57) ABSTRACT

The present invention relates to a node and a method thereof for a mobile telecommunication network connectable to a controlling node and wirelessly connectable to mobile terminals. The node is adapted to have an uplink connection to a mobile terminal, wherein the mobile terminal is adapted to have a second uplink connection to at least a second node such that data transmitted from the mobile terminal may be received at the node and at the at least the second node. The node comprises means for estimating whether data transmitted from the mobile terminal received at the at least the second node is received stronger than the data received at said node and means for discarding data received from the mobile terminal if it is estimated that the data is received stronger at the at least the second node than the data received at said node.

4 Claims, 5 Drawing Sheets

METHOD FOR REDUCING UPLINK TRAFFIC LOAD ON TRANSPORT NETWORK AT BASESTATION DURING SOFT HANDOVER

FIELD OF THE INVENTION

The present invention relates to arrangements in a mobile communication network. In particular, the present invention relates to an improvement for soft handover in the uplink.

BACKGROUND OF THE INVENTION

The present invention relates to methods and arrangements in a radio access network of a cellular mobile network. An example of such a radio access network is the UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. One RNC may be connected to another RNC via the Iur interface 160. Furthermore, the respective RNC 110 controls a plurality of Node Bs 120, 130 also referred to as radio base stations. The Node Bs are connected to the RNC by means of the Iub interface 140. Each Node B covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150. The network of FIG. 1 is also referred to as a WCDMA network and is based on the WCDMA standard specified by the 3:rd Generation Partnership Project (3GPP).

Requirements for mobile data access are increasing and demand for bandwidth is growing. To meet these needs the High Speed Data Packet Access (HSDPA) specification has been defined. HSDPA is based on WCDMA evolution standardized as part of 3GPP Release 5 WCDMA specifications. HSDPA is a packet-based data service in WCDMA downlink with data transmission peak rate up to 14.4 Mbps over a 5 MHz bandwidth. Thus HSDPA improves system capacity and increases user data rates in the downlink direction. The improved performance is based on adaptive modulation and coding, a fast scheduling function and fast retransmissions with soft combining and incremental redundancy. HSDPA utilizes a transport channel named the High Speed Downlink Shared Channel (HS-DSCH) that makes efficient use of valuable radio frequency resources and takes bursty packet data into account. This is a shared transport channel which means that resources, such as channelization codes, transmission power and infra structure hardware, is shared between several users.

In 3GPP Release 6, the WCDMA standard is further extended with the Enhanced Uplink concept, also denoted High Speed Uplink Packet Access (HSUPA), by introducing the Enhanced Dedicated Transport Channel, E-DCH. A further description can be found in 3GPP TS 25.309 "FDD Enhanced Uplink; Overall description". This concept introduces considerably higher peak data-rates in the WCDMA uplink. Features introduced with E-DCH include fast scheduling, fast Hybrid Automatic Repeat reQuest (HARQ) with soft combining and Node B controlled scheduling. It should be noted that uplink is the direction from the UE to the node B.

Fast scheduling means that the Node B can indicate to each UE the rate the UE is allowed to transmit with. This can be done every TTI, i.e. fast. Thus, the network is able to control the interference in the system very well.

HARQ is a more advanced form of an ARQ retransmission scheme. In conventional ARQ schemes the receiver checks if a packet is received correctly. If it is not received correctly, the erroneous packet is discarded and a retransmission is requested. With HARQ the erroneous packet is not discarded. Instead the packet is kept and combined with a result of the retransmission. That implies that even if both the first transmission and the retransmission are erroneous, they may be combined to decode the packet correctly. This means that fewer retransmissions are required.

Enhanced uplink supports soft handover. FIG. 2 illustrates a scenario when a UE denoted SHO is in soft handover, i.e. the UE SHO is connected to more than one Node B simultaneously. Hence, Packet Data Units (PDUs) transmitted from the UE SHO can be received in several Node Bs. HARQ retransmissions are performed between the UE and the Node Bs in the active set. The active set is the set of Node Bs that the UE is simultaneously connected to. Each Node B that receives a PDU correctly forwards the PDU to the RNC. The RNC comprises means for reordering PDUs and means for selection combining, which implies that the better PDUs are selected and the other discarded. Consequently, PDU duplicates are filtered out and PDUs are delivered in-sequence to the network. Each Node B that is in the active set, but does not receive a PDU correctly, requests retransmissions of the PDUs by the UE. Thus, a consequence of soft-handover support is that multiple copies received in different Node B:s of the same PDU may be transmitted through the UTRAN transport network, i.e. between the RNC and The Node B on the Iub and between RNCs on the Iur interfaces.

In some cases, the Iub and/or Iur interface is the bottleneck in the UTRAN system and the Iub and/or Iur interface is limiting the performance. This can either be a permanent situation due to that the transport network is under-dimensioned, or it can occur during shorter time periods due to temporary overload situations on the Iub and/or Iur interface.

In case the Transport Network is the bottleneck, the transmission of duplicates in the Transport Network due to soft handover is highly undesirable. However, it is not desirable to remove the soft handover completely since this would give a performance loss over the radio interface. This is because soft-handover also implies power-control from multiple sites, and removing this aspect by reducing the active set to one cell/site may increase the inter-cell interference significantly. Thus, in a scenario when the Iub and/or Iur interface is limiting the performance, it would be desirable to retain soft-handover support in terms of power-control but avoiding that multiple copies of the same data units are transmitted through the Transport Network.

SUMMARY

The object of the present invention is thus to reduce the load in the transport network during soft handover in the uplink.

The invention provides a method and a node that reduces the uplink load in the transport network by estimating whether data transmitted from the mobile terminal received at the at least a second node is received stronger than the data received at said node and discarding the data received from the mobile terminal if it is estimated that the data is received stronger at the at least a second node than the data received at said node.

The present invention is according to one embodiment realised through means for estimating if a Node B is power controlling a UE, since if the Node B power controls the UE that is an indication that the UE has the strongest link to this Node B. If it has the strongest uplink, the Node B forwards the data to the RNC. If the Node B is not power controlling the UE the Node B does not forward the data to the RNC.

The invention may also include means for avoiding that data is discarded by "all" receiving Node Bs in case of power limitation. Thus, means for detecting if the UE is power limited is provided.

Further, the node may also comprise means for detecting if the UE, that is connected to said node, is in soft handover with at least a second node.

Conceptually, the invention provides a fast method for selecting the Node B, which is responsible for uplink data reception, while still retaining the concept of soft-handover support in a power-control sense.

DETAILED DESCRIPTION OF THE PRESENT INVENTION

Figure 1:
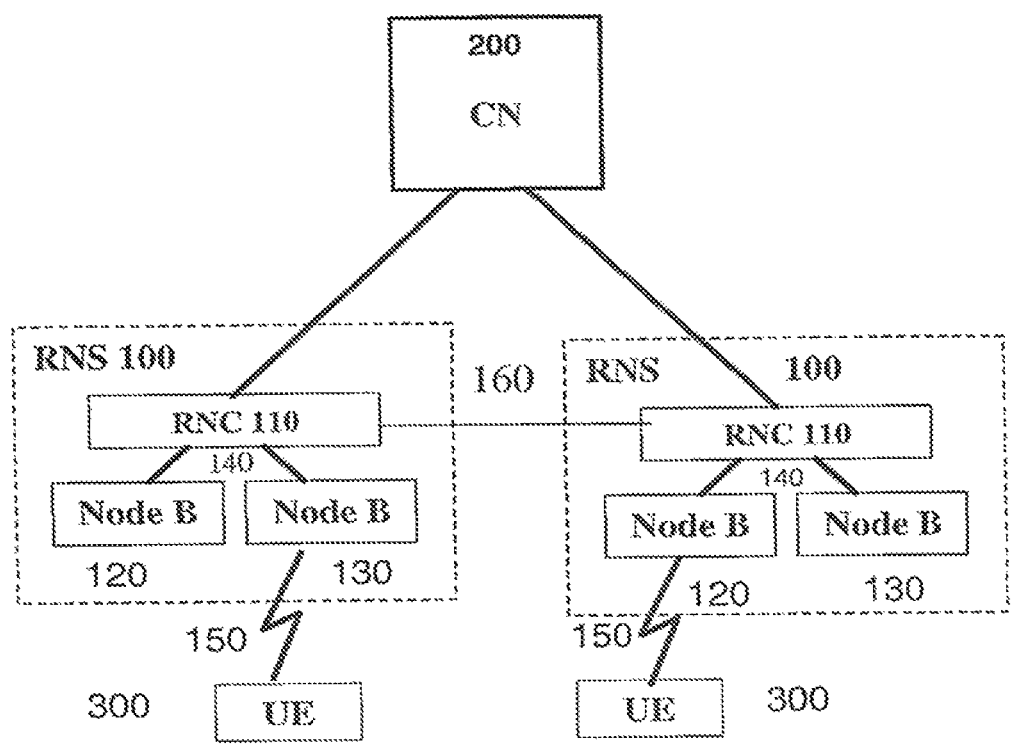
FIG. 1 illustrates a mobile telecommunication system wherein the present invention may be implemented.
Figure 2:
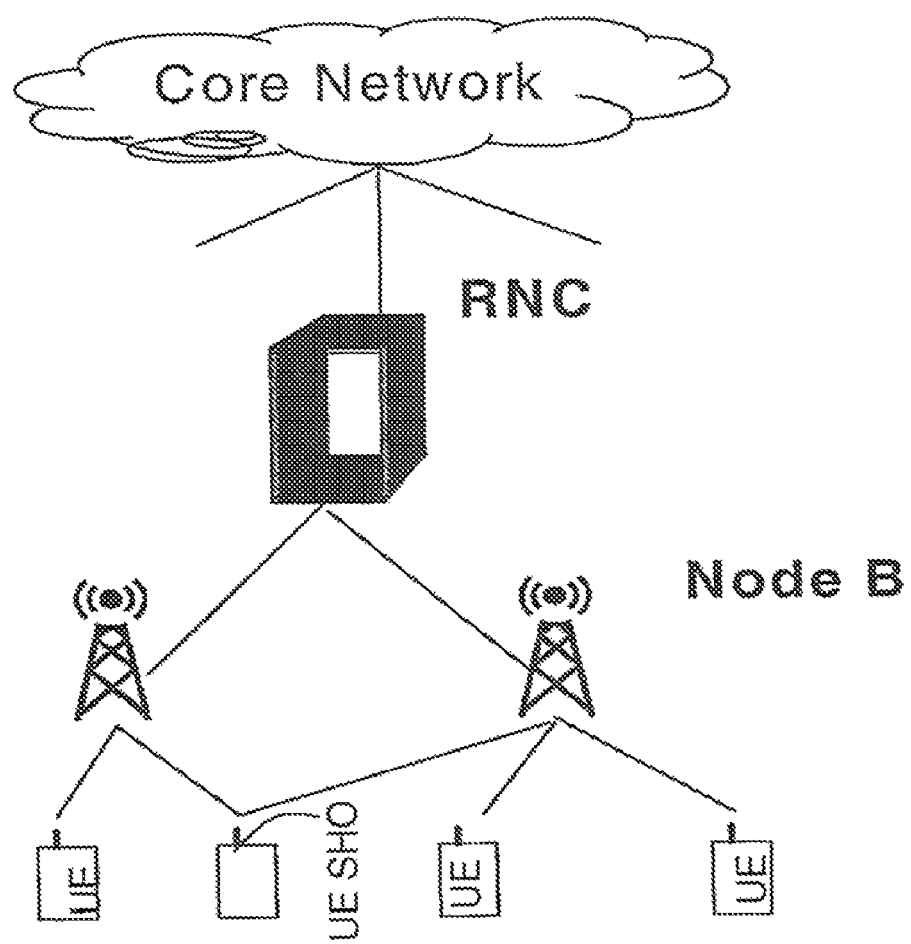
FIG. 2 illustrates soft-handover in a UMTS network.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is applicable to the scenario when a Node B, also referred to as a base station, has an uplink connection to a UE, wherein the UE has at least one further uplink connection to a second Node B. I.e. the UE is in soft handover.

As stated above, performance is degraded when the Iub and/or Iur links are the bottleneck links and when several Node Bs transmit the same PDUs over the Iub during soft handover.

The present invention provides a method and a node, e.g. a Node B, for avoiding the transmission of multiple copies of the same data entities from a UE through the transport network (e.g. from the Node B to the RNC) by performing a fast selection in the node, where the selection mechanism decides whether a successfully received data entity shall be forwarded to the controlling node, e.g. the RNC, or not while the UE still remains in soft handover.

Note that the description is here in the context of enhanced uplink and E-DCH. However, the present invention is also applicable to Release 99 DCH channels and to other cellular systems supporting soft handover in the uplink, which implies that the present invention is not limited to a WCDMA network. Therefore the node, referred herein to as Node B may be any node receiving uplink data from a mobile terminal and the controlling node referred herein to as RNC may be any controlling node that combines or selects received data that is transmitted from one mobile terminal to a multiple nodes (base stations) during soft handover.

The present invention is based on the idea to only forward packets from the node B to the RNC from the Node B having the strongest link preferably at times of Iub overload, which reduces the load over the bottleneck Iub link. The resulting behaviour is that data is typically only forwarded by one Node B at a time i.e. the Node B having the momentary strongest uplink.

Thus the present invention relates to a node, e.g. a Node B for a mobile telecommunication network connectable to a controlling node, e.g. a RNC, and wirelessly connectable to mobile terminals, also referred to as UEs. The node is adapted to have an uplink connection to a mobile terminal, wherein the mobile terminal is adapted to have a second uplink connection to at least a second node such that data transmitted from the mobile terminal may be received at the node and at the at least the second node, i.e. the mobile terminal is adapted to be in soft handover. The node comprises according to the present invention means for estimating whether data transmitted from the mobile terminal received at the at least a second node is received stronger than the data received at said node and means for discarding the data received from the mobile terminal if it is estimated that the data is received stronger at the at least a second node than the data received at said node.

In order to estimate if a Node B has the strongest uplink to the UE, the Node B may according to a first alternative estimate if it has the lowest UL pathloss to the UE among the Node Bs in the active set or not. In WCDMA enhanced uplink this estimation can be done based on the transmitted power control commands. If a Node B has sent only power up commands during the latest time T it can conclude that the UE is not responding to the power control commands. The likely reason for this is that there is another Node B with a lower pathloss to the UE that is power controlling the UE. The Node B can at this stage conclude that if it has only sent power up commands during the last time T it means that another Node B is likely power controlling the UE. Thus, this Node B discards the received data. Note: In this case the Node B also transmits a negative acknowledgement to the UE even if the data was correctly received, in order to force a retransmission in case no other Node B received the data either.

On the other hand, if the Node B has sent a mix between power up and power down commands during the last time period T it concludes that it has the best link to the UE and forwards the received data to the RNC.

In order to estimate if a Node B is power controlling a UE, the Node B may according to a second alternative use the difference between the target SIR and the received SIR to determine if it is power controlling the UE or not (instead of analyzing the transmitted power control commands). If the difference is above a threshold it can be concluded that the UE is not obeying the power control commands. The rest of the functionality is identical to the first alternative.

It should be noted that the UE may be power limited. In such a situation data that should have been forwarded is discarded. Therefore, in a preferred embodiment of the present invention, it should be investigated whether the UE is power limited which can be done by detecting whether the transport block (TB) size is below a certain threshold.

Figure 3A:
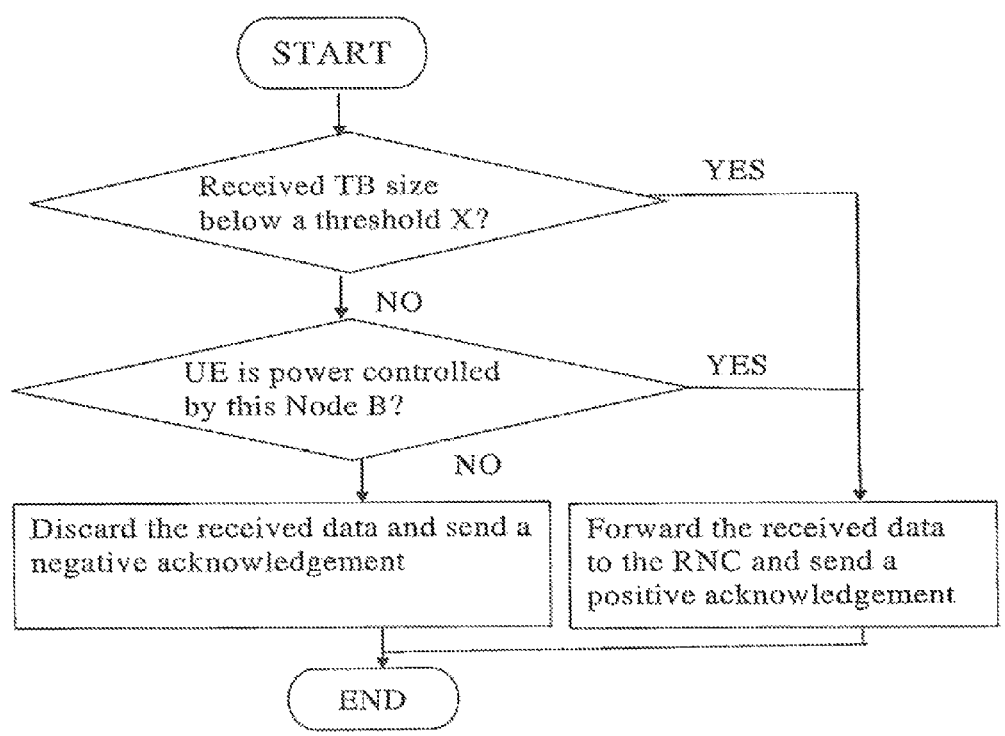
FIG. 3a-3c are flowcharts describing methods according to three embodiments of the present invention. The illustrated sequence of the flowchart is performed in a Node B when a data block is received correctly.

Thus the preferred embodiment combines the means for estimating if a Node B is power controlling a UE with means for detecting whether the transport block (TB) size is below a certain threshold. This threshold typically corresponds to the configured minimum E-DCH rate. Thus as long as the UE is transmitting TB sizes larger than the minimum rate it can be expected that it is not power limited. That depends on that there is an E-TFC selection algorithm specified for the UE that adapts TB size to the radio conditions. Basically the algorithm tries to keep the block error probability (BLEP) constant. That means that when the UE moves out of a cell the TB size will be reduced since the UE power is not enough to send a large TB size with the desired BLEP. The TB size will however never be reduced below the (configurable) minimum TB size (i.e. minimum rate). This means that if a TB size that is larger than the minimum size is sent, this is an indication that the UE still has power to send this TB with the desired BLEP. If the minimum TB size is sent this could still mean that the UE power is sufficient but it could also mean that the E-TFC algorithm actually would like to send a smaller TB size to keep the BLEP but this is prevented by the configured minimum TB size. Also the load on the Iub is most problematic in case the received TB is large. Thus if the received transport block size is below a certain threshold the Node B forwards the data to the RNC. As illustrated in FIG. 3a, it is preferred that it should first be detected whether the transport block (TB) size is below a certain threshold. If the TB size is not below the certain threshold, then it should be estimated if the Node B is power controlling the UE. If the UE is not power controlled by this Node B then the received data should be discarded and a negative acknowledgement should be sent. If the UE is power controlled by this Node B then the received data should be forwarded to the RNC. Further, if the TB size is below the certain threshold, the received data should be forwarded to the.

Figure 3B:
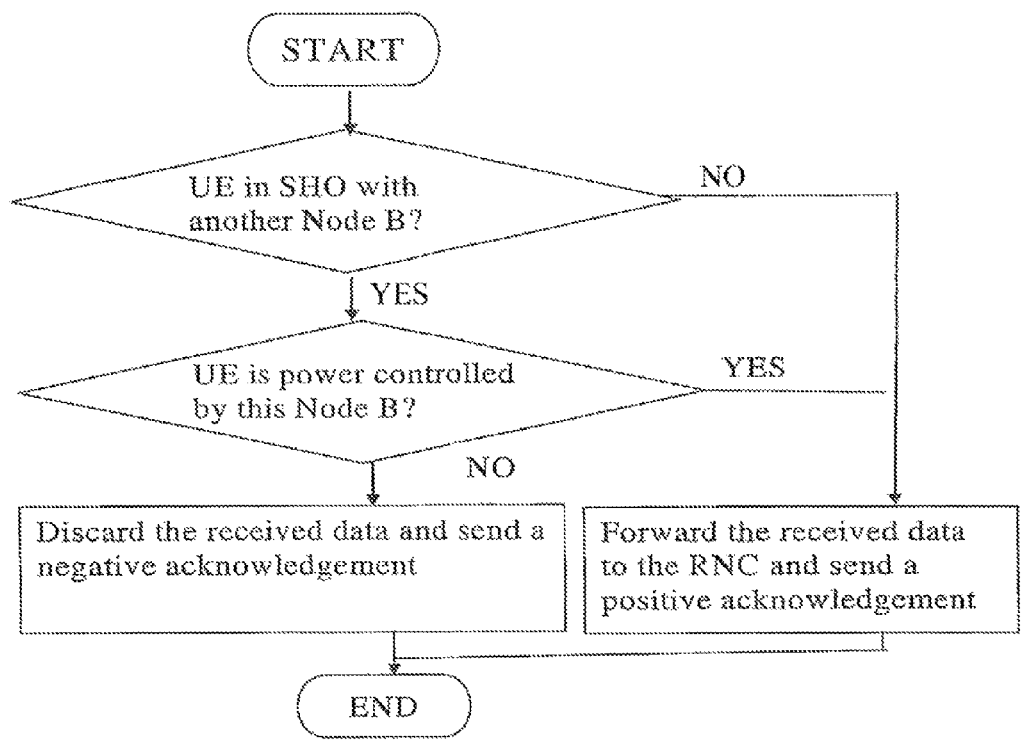

Alternatively, an embodiment of the present invention combines the means for estimating if a Node B is power controlling a UE with means for analyzing if the UE is in soft handover with another Node B. The determination of whether the UE is in soft handover can be determined from the Information Element (IE) "multiple RL sets indicator" sent from the RNC to the Node B. As illustrated in FIG. 3b, it is preferred that it should first be analyzed whether the UE is in soft handover with another Node B, i.e. if the UE is connected to a further Node B. If the UE is in soft handover, then it should be estimated if the Node B is power controlling the UE. If the UE is not power controlled by this Node B then the received data should be discarded and a negative acknowledgement should be sent. If the UE is power controlled by this Node B then the received data should be forwarded to the RNC and a positive acknowledgement should be sent. Further, if the UE is not in soft handover with another Node B, the received data should be forwarded to the RNC and a positive acknowledgement should be sent.

Alternatively, an embodiment of the present invention combines the means for estimating if a Node B is power controlling a UE with means for determining if the UE is in soft handover with another Node B or not and with means for detecting whether the transport block (TB) size is below a certain threshold.

Figure 3C:
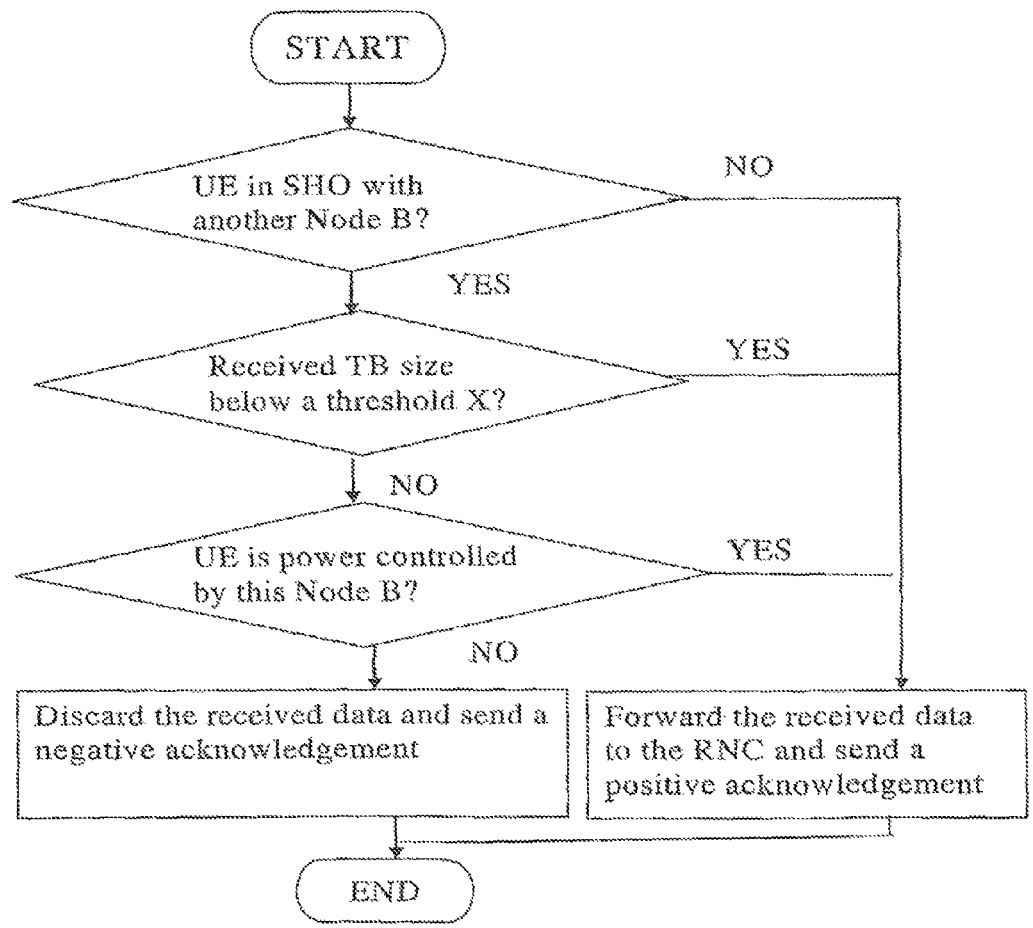

As illustrated in FIG. 3c, a Node B analyzes first if the UE is in soft handover with another Node B. If the UE is not in soft handover with another Node B, the Node B forwards all received packets to the RNC. If the UE is in soft handover with another Node B the Node B continues with the next step of detecting whether the transport block (TB) size is below a certain threshold.

If the received transport block size is below a certain threshold the Node B forwards the data to the RNC. In case the TB size is larger than the threshold the Node B continues with step 3.

In step 3, it is estimated if a Node B is power controlling the UE. If the UE is not power controlled by this Node B then discard the received data and send a negative acknowledgement. If the UE is power controlled by this Node B then forward the received data to the RNC.

The invention is suitable for cases when the Iub and/or Iub is the bottleneck link. The arrangement according to the present invention can be configured for certain cells in a static fashion, as part of the deployment configuration. The static configuration is suitable when it is known that the Iub links to certain Node Bs are under-dimensioned. Alternatively, the arrangement according to the present invention can be turned on only in case of overload on the Iub and/or Iur link. This can be detected by the RNC by using frame numbers specified for this purpose. In case the RNC detects overload on the Iub there is a specified overload indication, a control message that the RNC can send to the Node Bs to indicate overload. Note that the overload detection mechanism and overload indication is already specified by 3GPP. However 3GPP does not specify any actions to be taken in case overload occurs. The present application assumes that the Node B is made aware of the overload situation either by configuration or due to a received overload indication from the RNC.

The present invention is advantageous in areas where the overlap between cells is large, since the gain from the reduced load on Iub is larger than a possible loss over Uu. In case the overlap between the cells is small, the present invention can be configured to forward the small packets that are received when the UE is on the cell border to the RNC.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method implemented by a node in a mobile telecommunication network, said node connectable to a controlling node and wirelessly connectable to mobile terminals, the node adapted to have an uplink connection to a mobile terminal, wherein the mobile terminal is adapted to have a second uplink connection to at least a second node such that data transmitted from the mobile terminal may be received at the node and at the at least the second node, said method comprising the steps of:
  estimating if the mobile terminal is power controlled by said node, and
  discarding the data received from the mobile terminal if the mobile terminal is estimated to not be power controlled by said node.

2. The method according to claim 1, further comprising:
  determining if the mobile terminal is power limited; and
  forwarding data to the controlling node if it is determined the mobile terminal is not power limited or if the mobile terminal is estimated to be power controlled by said node.

3. The method according to claim 1, further comprising:
  determining if the mobile terminal is in short handover with the at least a second node; and
  forwarding data to the controlling node if it is determined the mobile terminal is not in short handover with the at least a second node or if the mobile terminal is estimated to be power controlled by said node.

4. The method according to claim 1, further comprising:
  determining if the mobile terminal is in short handover with the at least a second node;
  determining if the mobile terminal is power limited; and
  forwarding data to the controlling node if it is determined the mobile terminal is not in short handover with the at least a second node, or if it is determined the mobile terminal is not power limited, or if the mobile terminal is estimated to be power controlled by said node.

* * * * *

UNITED STATES PATENT AND TRADEMARK OFFICE
CERTIFICATE OF CORRECTION

| | |
|---|---|
| PATENT NO. | : 8,010,115 B2 |
| APPLICATION NO. | : 12/097663 |
| DATED | : August 30, 2011 |
| INVENTOR(S) | : Sågfors et al. |

It is certified that error appears in the above-identified patent and that said Letters Patent is hereby corrected as shown below:

In Column 5, Line 23, after "forwarded to the" insert -- RNC. --.

Signed and Sealed this
Seventh Day of February, 2012

David J. Kappos
*Director of the United States Patent and Trademark Office*